United States Patent
Chapman, Jr.

(10) Patent No.: US 12,427,456 B2
(45) Date of Patent: Sep. 30, 2025

(54) SORBENT INDOOR AIR PURIFIER

(71) Applicant: William H. Chapman, Jr., Boca Raton, FL (US)

(72) Inventor: William H. Chapman, Jr., Boca Raton, FL (US)

(*) Notice: Subject to any disclaimer, the term of this patent is extended or adjusted under 35 U.S.C. 154(b) by 637 days.

(21) Appl. No.: 17/807,449

(22) Filed: Jun. 17, 2022

(65) Prior Publication Data

US 2023/0018113 A1    Jan. 19, 2023

Related U.S. Application Data

(60) Provisional application No. 63/203,313, filed on Jul. 16, 2021.

(51) Int. Cl.
*B01D 53/34* (2006.01)
*B01D 39/02* (2006.01)
(Continued)

(52) U.S. Cl.
CPC ............ *B01D 39/02* (2013.01); *B01D 53/02* (2013.01); *B01D 53/1487* (2013.01); *B01D 53/18* (2013.01); *B01D 53/34* (2013.01); *B01J 20/28028* (2013.01); *B01J 20/3092* (2013.01); *B01J 20/324* (2013.01); *B01D 2101/02* (2013.01); *B01D 2201/307* (2013.01); *B01D 2257/2066* (2013.01); *B01D 2257/70* (2013.01); *B01D 2258/06* (2013.01)

(58) Field of Classification Search
CPC ................................. B01D 53/02; B01D 53/34
See application file for complete search history.

(56) References Cited

U.S. PATENT DOCUMENTS

| | | | |
|---|---|---|---|
| 4,448,757 | A | 5/1984 | Barnwell et al. |
| 4,920,270 | A | 4/1990 | Grodzins |

(Continued)

FOREIGN PATENT DOCUMENTS

| | | | |
|---|---|---|---|
| JP | 2006272078 | A * | 10/2006 |
| JP | 2006312490 | * | 11/2006 |
| WO | 2017157987 | A1 | 9/2017 |

OTHER PUBLICATIONS

International Search Report and Written Opinion; PCT/US22/43588; Mailed Feb. 8, 2023.

*Primary Examiner* — Robert A Hopkins
(74) *Attorney, Agent, or Firm* — Dunlap Bennett & Ludwig, PLLC; Anna L. Kinney

(57) ABSTRACT

A diffusive air purifier includes an air permeable container containing a chemical sorbent or a sorbent precursor. The sorbent has a chemical composition selected to achieve removal of an air pollutant via a chemical reaction that renders the predetermined air pollutant immobile. A method of manufacturing the diffusive air purifier includes impregnating a porous solid with a solution of sorbent precursor and a binding agent and drying the porous solid. A method of purifying indoor air includes detecting a measured concentration of an airborne chemical in an enclosed location; selecting the diffusive air purifier to adsorb the airborne chemical; and placing the diffusive air purifier in the enclosed location. Air diffuses through the outer container and into the sorbent where the chemical to be removed is retained. Air, free of the target chemical, diffuses out of the container and the process repeats.

15 Claims, 6 Drawing Sheets

(51) Int. Cl.
  *B01D 53/02* (2006.01)
  *B01D 53/14* (2006.01)
  *B01D 53/18* (2006.01)
  *B01J 20/28* (2006.01)
  *B01J 20/30* (2006.01)
  *B01J 20/32* (2006.01)

(56) References Cited

U.S. PATENT DOCUMENTS

| | | |
|---|---|---|
| 4,975,575 A | 12/1990 | Perlman |
| 5,207,877 A | 5/1993 | Weinberg et al. |
| 5,626,820 A | 5/1997 | Kinkead et al. |
| 5,690,101 A | 11/1997 | Kutta |
| 7,335,244 B2 | 2/2008 | Kisakibaru et al. |
| 7,758,674 B2 | 7/2010 | Dallas et al. |
| 7,861,719 B1 | 1/2011 | Grove et al. |
| 7,882,754 B2 | 2/2011 | Suga et al. |
| 7,927,567 B2 | 4/2011 | Yamanaka et al. |
| 8,173,219 B2 | 5/2012 | Tutin et al. |
| 8,685,150 B1 | 4/2014 | Caudle |
| 8,882,874 B1 | 11/2014 | Cross |
| 10,024,769 B2 | 7/2018 | Perez Ballesta |
| 10,456,736 B2 | 10/2019 | Zhu |
| 10,493,379 B2 | 12/2019 | Giese et al. |
| 10,591,210 B2 | 3/2020 | Castelucci et al. |
| 2006/0130451 A1 | 6/2006 | Ding et al. |
| 2007/0231230 A1 | 10/2007 | Meserole et al. |
| 2008/0135060 A1 | 6/2008 | Kuo et al. |
| 2009/0053989 A1 | 2/2009 | Lunde et al. |
| 2010/0316534 A1 | 12/2010 | Niazi |
| 2014/0205505 A1* | 7/2014 | Kirollos ........ G01N 31/22 422/119 |
| 2016/0213003 A1 | 7/2016 | Zhu et al. |
| 2019/0209954 A1 | 7/2019 | Fox et al. |
| 2020/0122071 A1 | 4/2020 | Jasuja et al. |
| 2020/0182496 A1 | 6/2020 | Xiao et al. |
| 2020/0360559 A1 | 11/2020 | Fujiki et al. |
| 2020/0360737 A1 | 11/2020 | Weber et al. |
| 2020/0408427 A1 | 12/2020 | Alsadah |

* cited by examiner

SORBENT INDOOR AIR PURIFIER

CROSS-REFERENCE TO RELATED APPLICATION

This application claims the benefit of priority of U.S. provisional application No. 63/203,313, filed Jul. 16, 2021, the contents of which are herein incorporated by reference.

BACKGROUND OF THE INVENTION

The present invention relates to indoor air purification and, more particularly, to a sorbent indoor air purifier.

Air testing devices available today (e.g., mail-in samplers) often find dangerous chemicals present in indoor air.

No reasonably priced commercial devices are currently available that are proven to remove common dangerous chemicals like formaldehyde, vinyl chloride, or nitrogen dioxide. The few that are sold are not well validated and reports exist pointing out that they might not serve their intended purpose (e.g., Chao-Heng Tseng et. al.). They are also quite expensive, on the order of about $500-$1500. For example, the Dyson™ Purifier Cool Formaldehyde™ TP09 purifying fan claims to both measure and remove formaldehyde.

As can be seen, there is a need for an effective, inexpensive air purifier for removal of predetermined air contaminants.

SUMMARY OF THE INVENTION

In one aspect of the present invention, a diffusive air purifier comprises an air permeable container and a chemical sorbent or a precursor thereof contained within the permeable container, said chemical sorbent having a chemical composition selected to achieve removal of a predetermined air pollutant via a chemical reaction that renders the predetermined air pollutant immobile.

In another aspect of the present invention, a method of manufacturing the diffusive air purifier, comprises impregnating a porous solid with a solution of chemical sorbent precursor and a binding agent; and drying the porous solid.

In another aspect of the present invention, a method of purifying indoor air comprises detecting a measured concentration of an airborne chemical in an enclosed location; selecting the diffusive air purifier, wherein the diffusive air purifier is operative to adsorb a predetermined mass of the airborne chemical per a mass of chemical sorbent contained within the diffusive air purifier; and placing the diffusive air purifier in the enclosed location.

These and other features, aspects and advantages of the present invention will become better understood with reference to the following drawings, description, and claims.

DETAILED DESCRIPTION OF THE INVENTION

Figure 1:
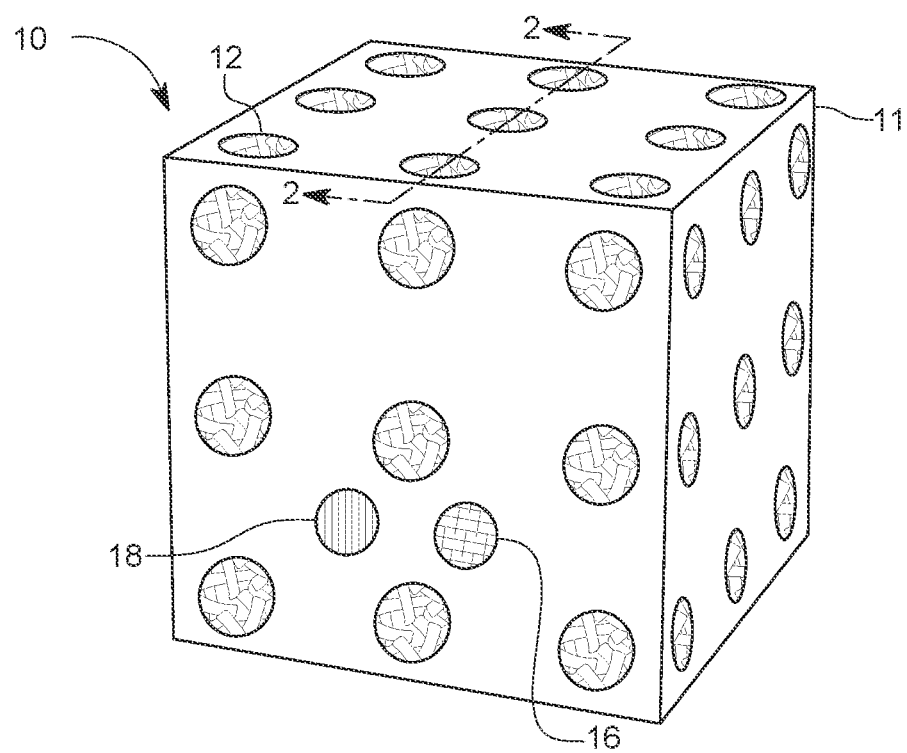
FIG. 1 is a perspective view of an air purifier according to an embodiment of the present invention.
Figure 2:
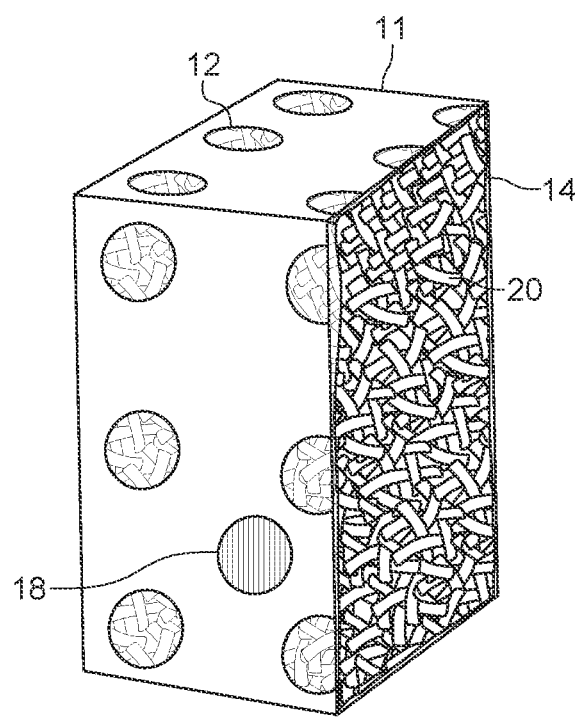
FIG. 2 is a sectional view thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is an air purifier device comprising a container enclosing a sorbent contained within a porous bag or comprising a sorbent impregnated onto a porous substrate. The air purifier device may also be referred to herein as a filter.

As used herein, the term "sorbent" refers to both an adsorbent and an absorbent. Either means of immobilizing an air pollutant may be used.

The inventive device is generally a passive air purifier. As used herein, the term "passive" indicates that the device relies on the diffusion of contaminants with ambient air into the device and onto a sorbent. Air diffuses through the holes in the outer container, through the porous bag or permeable pouch and into the sorbent where the chemical to be removed is rendered immobile. Air, free of the target chemical, diffuses out of the container and the process repeats. The inventive air purifier operates through a diffusive mechanism, capturing pollutants by using a specific chemical reaction.

The present invention provides a device effective to absorb specific chemicals at measured concentrations for specific times. The inventive device provides a low-cost and non-toxic method for the removal of specific common dangerous chemicals (e.g., formaldehyde, sulfuryl fluoride, etc., and any combination thereof) that compromise indoor air quality and are often found using low-cost, mail-in air samplers.

The inventive air purifier removes airborne chemicals (i.e., air pollutants) from the air through specific means that are well known. The device is generally proven to remove target contaminants through validation studies and its capacity to adsorb the specified contaminant is measured with a known error. Measured specifications enable the user to predict the device's lifetime.

The present invention employs diffusion combined with removal of a chemical by a known chemical reaction that produces a stable product without producing additional pollutants. Ionizers and other electrical devices are disadvantageous in that they tend to produce ozone or hydroxyl radicals which are pollutants in themselves or react with common household materials to produce formaldehyde or related pollutants.

The inventive device is preferably reasonably priced (e.g., <$200) to be available to much of the population.

The sorbents developed for use in the diffusive air purifiers may also be used in active purifiers that use fans or similar mechanisms to force air through a filter to remove dust. In this embodiment, the sorbent and adsorbed or absorbed product are generally secured to the filter.

The inventive device comprises an outer container that may contain the initial solid sorbent and the product of sorption. One type of container (for example but without limitation, a cardboard box) and porous bag may be used for both. The outer container may have holes, or apertures, enabling air to diffuse both in and out.

The sorbent chemical composition may be selected to achieve removal of a specific air pollutant. The sorbent chosen determines the target chemical removed from the air. In the case of formaldehyde, the chemical sorbent may contain sodium bisulfite or a similar composition. Formaldehyde reacts irreversibly with the bisulfite ion to yield a bisulfite-formaldehyde adduct which remains in the container as a solid. For example, formaldehyde may be converted to hydroxymethanesulfonate. In some embodiments, the sorbent may be triethanolamine for sorption of air pollutants such as, but not limited to, nitrogen dioxide ($NO_2$), sulfur dioxide ($SO_2$), formic acid, acetic acid, and related organic acids. For example, nitrogen dioxide may be converted to nitrite.

In some embodiments, the inventive device may comprise a mechanism to alert the user when to replace the filter, i.e., when the effective lifetime has ended. For example, a colorimetric indicator may be placed on the outer carton where it is clearly visible to estimate the mass of chemical captured by the filter enabling the user to determine when to replace the filter. In some cases, the colorimetric indicator may be placed next to a color standard that indicates the color of the colorimetric indicator when the filter is saturated. As used herein, the term "color standard" refers to a component having a predetermined color that has been determined to reproducibly indicate a predetermined saturation status. The indicator may be one of many types, including suitably formulated embodiments of those described by Lambert and Chiang in U.S. Pat. No. 4,511,658 and Liang Feng, Christopher J. Musto, and Kenneth S. Suslick in J Am Chem Soc. 2010 March 31; 132(12): 4046, the disclosures of which are incorporated by reference.

In some embodiments, a section of the filter may be sent to an accredited laboratory after a predetermined time for quantitative analysis. Measurement of the mass of chemicals adsorbed or absorbed over a measured period may give users a way to estimate the life of the filter in a specific environment. A report issued by the laboratory may inform the user when to replace the filter, i.e., what the remaining effective lifetime is estimated to be.

The device may be used as follows. The diffusive air purifier is simple enough to put on a shelf in an enclosed location such as a residential room and be forgotten for months. It may also be placed near the return for a heating, ventilation, and air-conditioning (HVAC) system or in any part of the ducts leading to a furnace or air-conditioning air handler. It removes the chemical targeted by detection with a mail-in sampler, reducing the risk of serious health consequences.

The device may be manufactured of low-cost, non-harmful materials according to a suitable method. The sorbent may be placed inside a porous bag and sealed. The sealed bag may be placed inside an outer container and the container may be sealed. For example, a sorbent for formaldehyde may be manufactured in bulk by combining an aqueous solution of sodium bisulfite with a porous solid (like a sorbent paper) and by applying heat to dry the wet paper. Similarly, the sorbent paper may first be coated with sodium hydroxide solution and later reacted with sulfur dioxide. The process may be accomplished easily on a reel-to-reel system, where the reagent is applied to the web and the web is dried using an infrared (IR) heating element. The sorbent may be shredded, the shredded sorbent may be stuffed into a mesh bag, the bag may be sealed, and the sealed bag may be put into the outer container which may in turn be sealed. The sorbent and suitable binding agent may alternatively be applied to an air filter configured for use in a commercially available air handler system. The mechanical properties of the sorbent may determine the manufacturing method, such that the sorbent and adsorbed or absorbed chemical remain fixed in the filter and do not leave in the form of dust.

Without intending to be limiting, the following embodiments are illustrative of the invention. Embodiment 1 is a diffusive air purifier that uses specific sorption means (chemical) well known in the art to remove specific chemical(s) from air and that is validated to remove this specific chemical using documented scientific methods. The device generally has a well-known sorption capacity of each specific chemical, i.e., a predetermined mass of chemical, per mass of sorbent and thus a useful lifetime that is estimated from the known concentration of the chemical and this sorption capacity. The sorption means may a known chemical reaction selected from the group consisting of a covalent bond forming reaction (including proton transfer) and a redox reaction. The product of the reaction may be detected after the air purifier is used by standard quantitative analytical methods such as ion chromatography.

Embodiment 2 is a diffusive air purifier, validated to adsorb specific chemical(s) from the air, that is constructed of the following three nested parts: 1) an outer carton with holes that enable air to pass into its interior through simple diffusion, 2) a mesh bag or similar porous pouch that fits into the carton that contains 3) a sorbent developed to adsorb specific chemicals, that is known to adsorb a well-defined mass of the chemical per mass of the sorbent.

Embodiment 3 is a sorbent developed for use in a chemical specific air purifier. The sorbent may use a chemical reaction that is well known in the sciences and is validated to absorb a specific mass of chemical per mass of sorbent. The sorbent may be formulated to remain in a specific physical state (e.g., mesh powder) after absorbing the specific chemical. This state may be measured in mesh, such that it is containable by a mesh bag in the diffusive air purifier device described herein, or in physical integrity of a coating made of the sorbent useful in a filter for an air handler or similar mechanically driven device.

Figure 3:
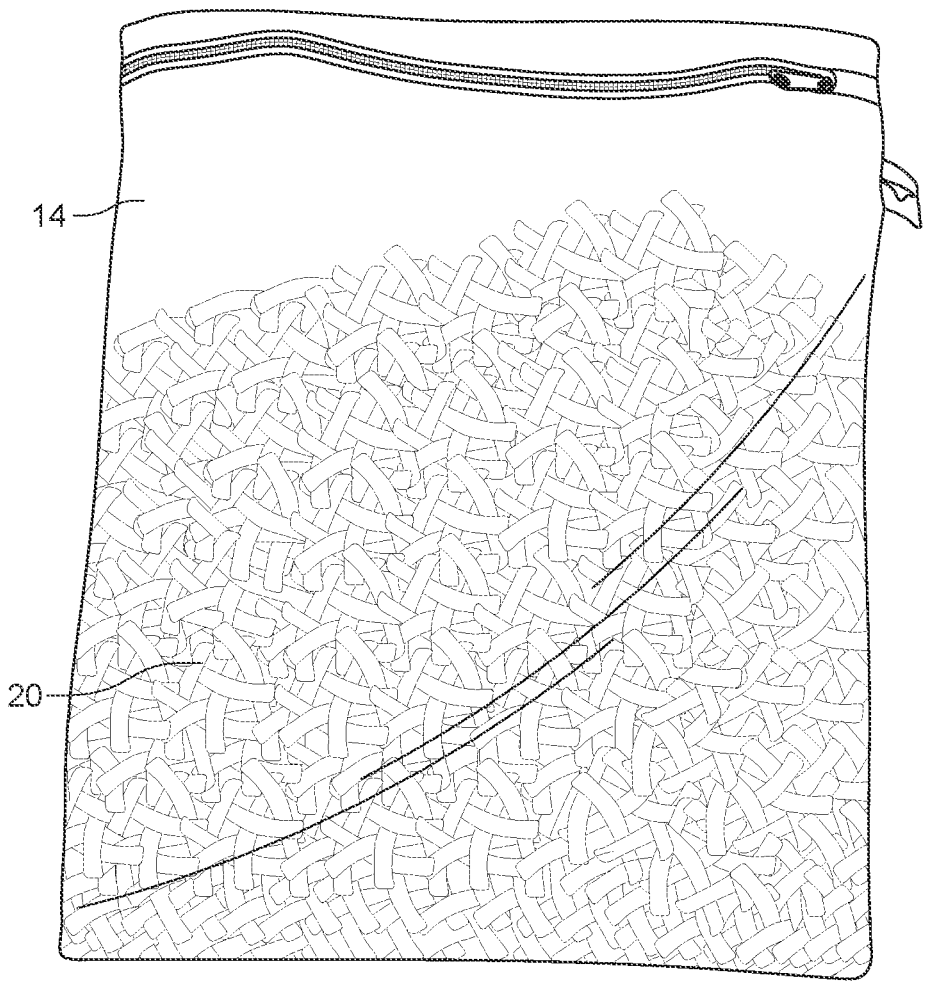
FIG. 3 is a front elevation view of an air purifier according to another embodiment of the present invention.
Figure 4:
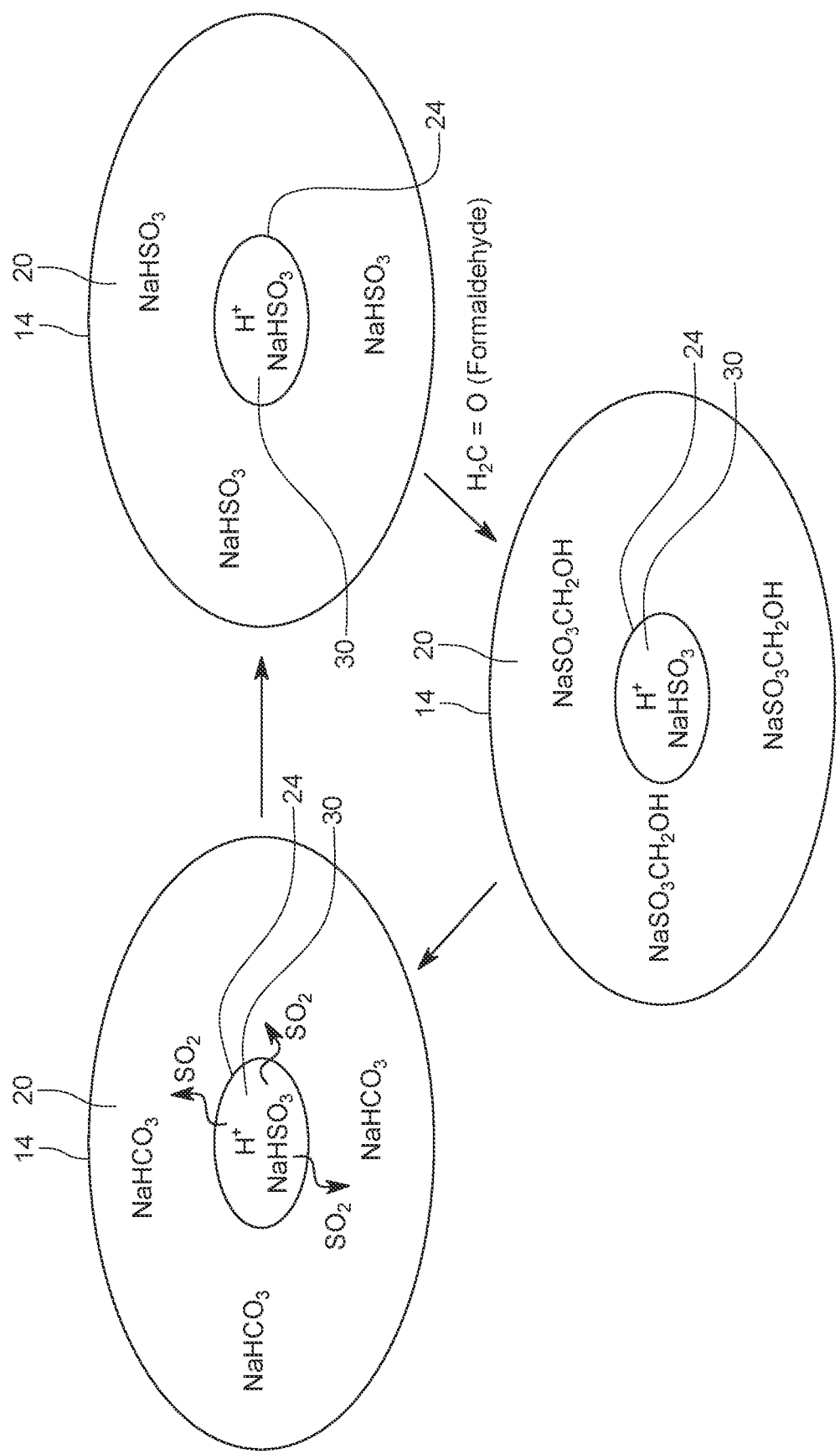
FIG. 4 is a schematic view of a process of operation of an air purifier according to an embodiment of the present invention.
Figure 5:
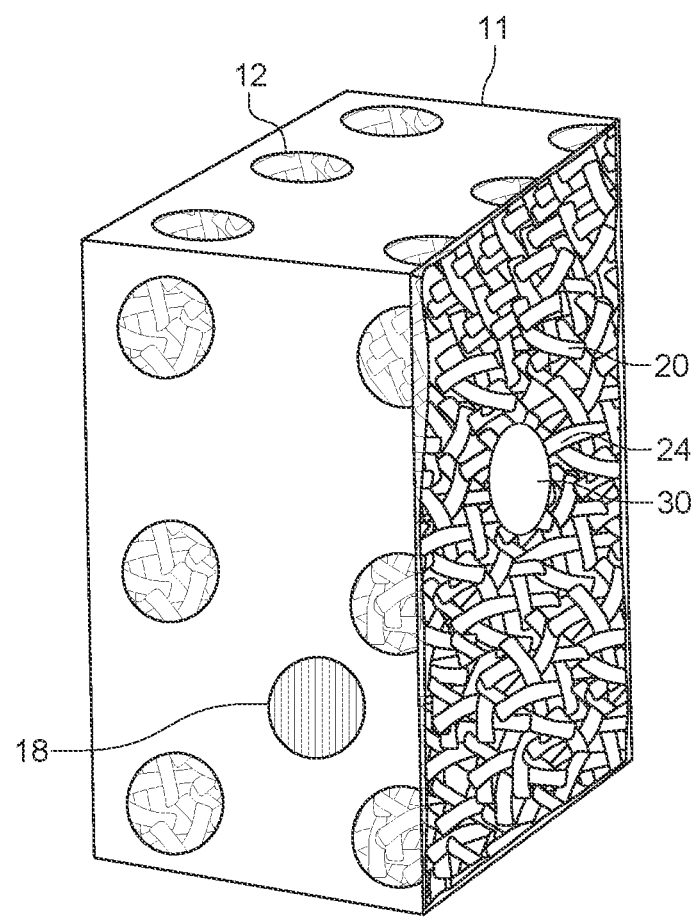
FIG. 5 is a sectional view of an air purifier according to another embodiment of the present invention.

Referring to FIGS. 1 through 6, 7A, and 7B, FIGS. 1 and 2 show an air purifier 10 according to an embodiment of the present invention comprising an outer container 11, with a plurality of holes 12 therethrough, and a mesh bag 14 containing a sorbent material 20. The outer container 11 has a colorimetric indicator 16 and a color standard 18 for comparison to determine whether the sorbent should be replaced and/or to determine whether the target chemical is present for removal. A mesh bag 14 containing sorbent material 20 according to an embodiment of the present invention is shown in FIG. 3. While the invention is not limited to formaldehyde removal, FIG. 4 schematically illustrates an example of gaseous formaldehyde ($H_2C=O$) adsorbate removal performed by another embodiment of the air purifier 10, shown in FIG. 5. A mesh bag 14 contains sorbent precursor material 20 comprising sodium bicarbonate ($NaHCO_3$) surrounding a sulfur dioxide ($SO_2$) source 30 surrounded by a permeable barrier 24, for example in the form of a ball. The sodium bicarbonate may be supported on a substrate or may be present as a pure solid, e.g., as particles. The sulfur dioxide source 30 contains sodium bisulfite (NaHSO$_3$) in an acidic environment (H$^+$), such as but not limited to, phosphoric acid or succinic acid, both of which are non-volatile and may be adjusted to a predetermined pH. The emitted sulfur dioxide reacts with the sodium bicarbonate sorbent precursor in or on the sorbent material 20 or substrate to form sodium bisulfite sorbent and carbon dioxide. The sodium bisulfite reacts with formaldehyde adsorbate entering the air purifier 10 to yield formaldehyde-sodium bisulfite adduct (NaSO$_3$CH$_2$OH), a solid at temperatures below 200° C. The process repeats with unconsumed reagents.

Figure 6:
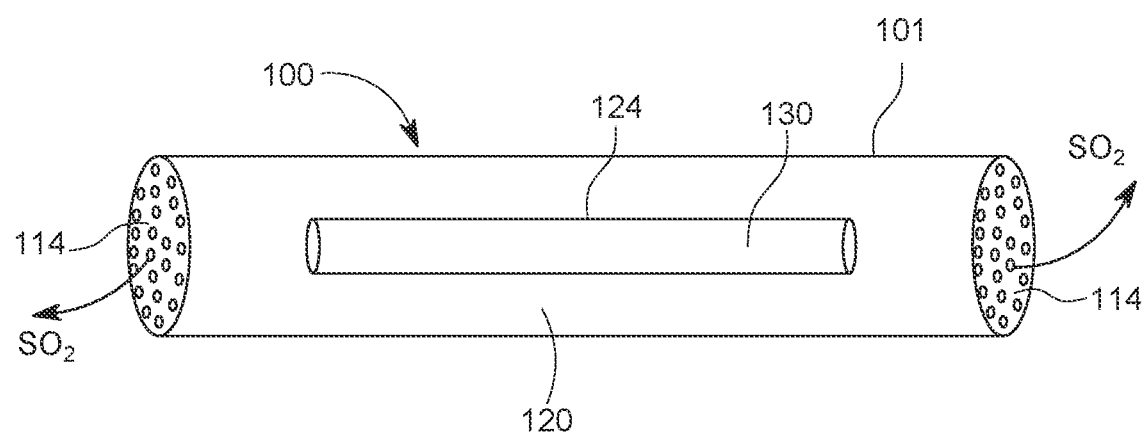
FIG. 6 is a cutaway schematic view of a sulfur dioxide source component of an air purifier according to another embodiment of the present invention.

As shown in FIG. 6, a sulfur dioxide source 100 according to another embodiment of the present invention a flexible plastic tubular container 101 with perforated or porous endcaps 114. Within the container 101, a sodium bisulfite gel solution 120 surrounds a glass tube 124 filled with succinic acid [(CH$_2$)$_2$(CO$_2$H)$_2$] or the like 130. The production of sulfur dioxide may be triggered by breaking the inner glass tube 124, releasing the acid 130. The diprotic succinic acid 130 reacts with the sodium bisulfite 120, releasing sulfur dioxide gas which reacts with a reagent in surrounding sorbent material.

Figures 7A, 7B:
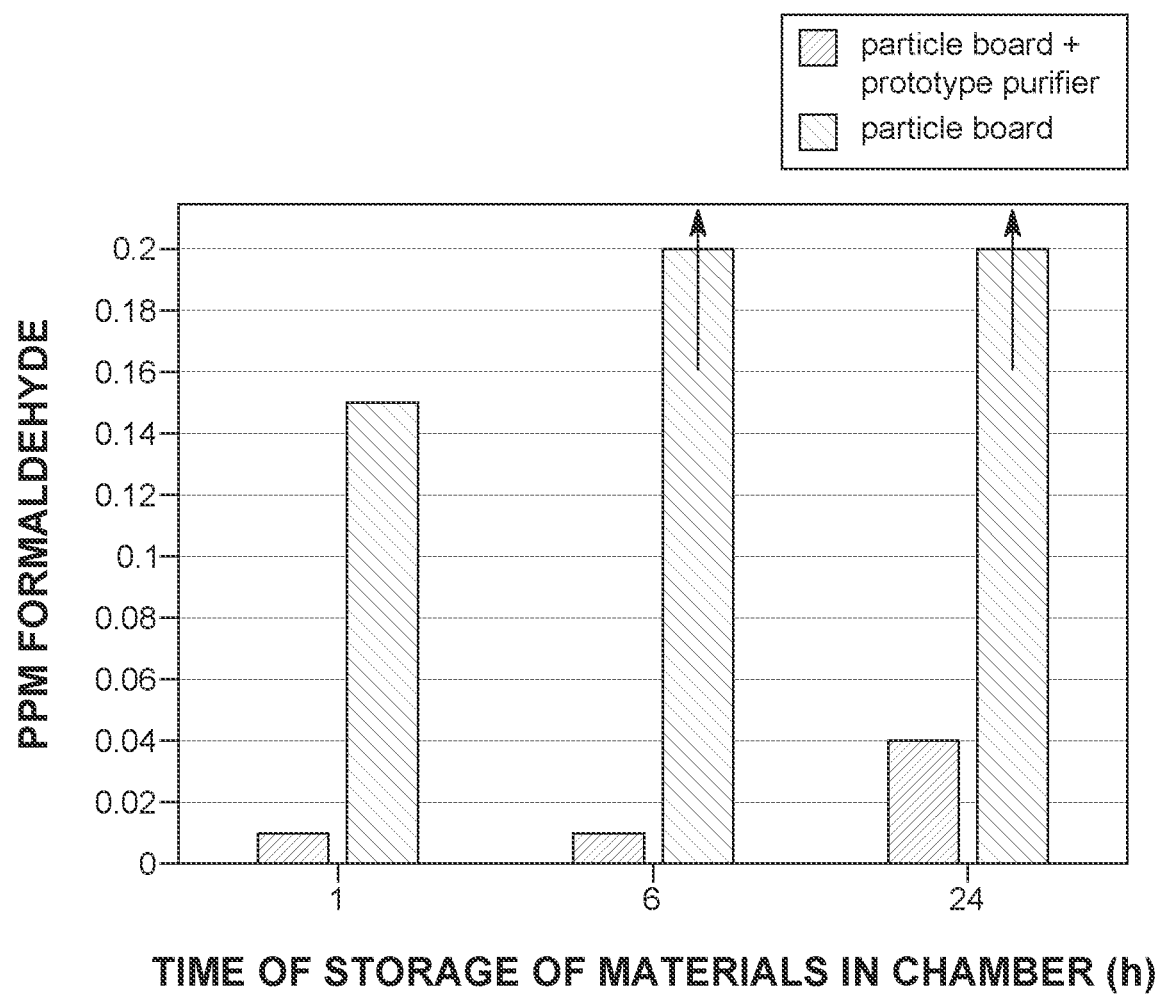
FIG. 7A is a graph of formaldehyde measured within a chamber containing particle board with and without an air purifier according to an embodiment of the present invention.
FIG. 7B is chart thereof.

FIGS. 7A and 7B illustrate data collected comparing formaldehyde detected in air surrounding particle board stored in a chamber with or without a prototype of the inventive air purifier. As shown in the Figures, the prototype air purifier dramatically reduces the formaldehyde content in the air within the chamber. The data was collected as discussed below.

Example 1. Production of Sorbents. Sodium bisulfite (3 g, Oakwood Chemicals #075234) was dissolved in water (250 mL) producing a 0.12 M solution in the bottom of an aluminum baking pan (Superking by Handi-Foil®, 11¾"× 9⅜"×3 3/16"). After the solid dissolved, 3 L of unpacked absorbent paper (Sophresh Super Absorbant Crinkle Paper, obtained from Petco™) was added to the pan and the liquids absorbed, agitating the paper periodically with a gloved hand. Once the liquid was completely adsorbed or absorbed (circa 30 min), the absorbent paper was allowed dry outdoors in the sun for 5 h (temperature average circa 90° C., 60% humidity in a shaded area). The dried sorbent media which smelled strongly of sulfur dioxide was divided into 3 portions, and these stored 1 stored in 1 gal Ziploc® bag.

Sorbent media was similarly impregnated with sodium bicarbonate and stored similarly in a plastic bag.

Example 2. Packaging of Sorbents. Materials were packaged for testing by placing into zippered washing bags (Target™). The sodium bicarbonate impregnated paper was placed into a large bag (circa 1 gal volume, 9½"×13" flat). The sodium bisulfite impregnated material was stuffed with some compression into a much smaller washing bag (circa ¼ gal, sold for washing women's bras by Target™). The apparatus was assembled for testing by placing the smaller bag in the center of the web of absorbent paper of the larger bag. Once assembled, the smell of the sulfur dioxide vanished, indicating that it was reacting with the sodium bicarbonate.

Example 3. Chamber Testing of Sorbent. A testing chamber was built using a 12-gal waterproof plastic container. The atmosphere inside the chamber was probed for formaldehyde vapor using colorimetric tube (Gastec® 91 PL) and an SKC™ pump (model 224-36) operated in low volume mode. The volume of air pumped through a detector tube was confirmed to be consistently 200 mL/min using a 50 mL pipet as a bubble meter, connecting the downwind side of the tube with Tygon® tubing. This was confirmed in real time with the instrument's flowrate meter. The chamber was sampled for 30 min per measurement at 78° F. One hole was drilled into either side of the chamber, and these were fitted with rubber grommets to hold the Gastec® tube in place with an airtight seal. The holes were sealed with metal pins when the chamber was not being sampled.

The formaldehyde source used for the experiment was produced using a piece of particle board (Home Depot™, ⅝"×2'×4' cut into 1' squared). A single 1" square of particle board was placed into the chamber, the chamber sealed, and it was allowed to outgas for 1 h. After 1 h, the concentration of formaldehyde in the chamber was measured to be 150 ppb. The chamber was opened, and the sorbent air purifier was added, and the chamber sealed. After 1 h, the concentration of formaldehyde was measured to be <20 ppb. The air purifier was removed, and the chamber was again sealed for 1 h. The concentration of formaldehyde in the chamber was found to have returned to 150 ppb. The experiment was repeated for 6 h and 24 h time intervals. In all cases the purifier was found to lower the formaldehyde levels (see FIG. 7B).

It should be understood, of course, that the foregoing relates to exemplary embodiments of the invention and that modifications may be made without departing from the spirit and scope of the invention as set forth in the following claims.

What is claimed is:

1. A diffusive air purifier comprising:
   a. an air permeable container; and
   b. a chemical sorbent or a precursor of the chemical sorbent contained within the permeable container, said chemical sorbent having a chemical composition selected to achieve removal of a predetermined air pollutant via a chemical reaction that renders the predetermined air pollutant immobile;
   wherein the chemical sorbent or the precursor is sodium bisulfite and the predetermined air pollutant is an aldehyde.

2. The diffusive air purifier of claim 1, further comprising a permeable pouch housed within the permeable container and surrounding the chemical sorbent.

3. The diffusive air purifier of claim 1, wherein the chemical sorbent is impregnated onto a porous substrate.

4. The diffusive air purifier of claim 1, wherein the container further comprises a colorimetric indicator adjacent to a color standard that indicates the color of the colorimetric indicator when the chemical sorbent is saturated.

5. The diffusive air purifier of claim 1, wherein the precursor of the chemical sorbent is present and further comprising an activator operative to chemically convert the precursor to the chemical sorbent.

6. The diffusive air purifier of claim 5, further comprising a flexible plastic tubular container with perforated endcaps containing the precursor; and a glass tube suspended within the flexible plastic tubular container, said glass tube containing the activator.

7. The diffusive air purifier of claim 5, wherein the sodium bisulfite is a gel solution and the activator is succinic acid.

8. A diffusive air purifier comprising:
   a. an air permeable container; and
   b. a chemical sorbent or a precursor of the chemical sorbent contained within the permeable container, said chemical sorbent having a chemical composition selected to achieve removal of a predetermined air pollutant via a chemical reaction that renders the predetermined air pollutant immobile, further comprising a sulfur dioxide source surrounded by a permeable barrier nested within the chemical sorbent, wherein the chemical sorbent is formed from a chemical sorbent precursor comprising sodium bicarbonate.

9. The diffusive air purifier of claim 8, wherein the sodium bicarbonate is supported on a substrate or is present as solid particles.

10. The diffusive air purifier of claim 8, wherein the sulfur dioxide source comprises sodium bisulfite in an acidic environment.

11. The diffusive air purifier of claim 8, further comprising a permeable pouch housed within the permeable container and surrounding the chemical sorbent.

12. The diffusive air purifier of claim 8, wherein the chemical sorbent is impregnated onto a porous substrate.

13. The diffusive air purifier of claim 8, wherein the container further comprises a colorimetric indicator adjacent to a color standard that indicates the color of the colorimetric indicator when the chemical sorbent is saturated.

14. The diffusive air purifier of claim 8, further comprising an activator operative to chemically convert the chemical sorbent precursor to the chemical sorbent.

15. The diffusive air purifier of claim 14, further comprising a flexible plastic tubular container with perforated endcaps containing the chemical sorbent precursor; and a glass tube suspended within the flexible plastic tubular container, said glass tube containing the activator.

* * * * *